United States Patent
Zhu et al.

(10) Patent No.: US 10,110,474 B2
(45) Date of Patent: Oct. 23, 2018

(54) UPDATING INTERFACE LIST OF MULTI-LINK GROUP

(71) Applicant: Arista Networks, Inc., Santa Clara, CA (US)

(72) Inventors: Feng Zhu, San Jose, CA (US); Di Wang, Monte Sereno, CA (US); Simon Francis Capper, San Jose, CA (US); Kartik Chandran, Los Altos, CA (US); Sriram Chidambaram, Sunnyvale, CA (US); Hemanth Murthy, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 23 days.

(21) Appl. No.: 15/272,293

(22) Filed: Sep. 21, 2016

(65) Prior Publication Data
US 2018/0083863 A1 Mar. 22, 2018

(51) Int. Cl.
*H04L 12/709* (2013.01)
*H04L 29/12* (2006.01)

(52) U.S. Cl.
CPC ........ *H04L 45/245* (2013.01); *H04L 61/6022* (2013.01)

(58) Field of Classification Search
CPC .................. H04L 45/245; H04L 61/6022
See application file for complete search history.

(56) References Cited

U.S. PATENT DOCUMENTS

| | | | |
|---|---|---|---|
| 6,711,163 B1* | 3/2004 | Reid .................. | H04L 12/1836 370/390 |
| 2014/0294010 A1* | 10/2014 | Biswas ................ | H04L 45/245 370/392 |

* cited by examiner

*Primary Examiner* — Omar J Ghowrwal
(74) *Attorney, Agent, or Firm* — Womble Bond Dickinson (US) LLP

(57) ABSTRACT

A method and apparatus of a network element that updates an interface list of a multi-link group of a network element is described. In an exemplary embodiment, a network element receives an indication that the interface list for the multi-link group on a network element is to change. In addition, the interface list includes a first set of interfaces. The network element further includes an address table having a plurality of address entries, where each of the plurality of address entries includes an address, a multi-link nexthop, and a tag group reference. The tag group reference references an entry in a tag group table, where a tag group entry includes a tag group identifier and a tag group set of interfaces. The network element further receives a second set of interfaces. The network element additionally updates the interface list for the tag group entry to include a second set of interfaces. Furthermore, the network element transmits data with the multi-link group using the second set of interfaces.

20 Claims, 10 Drawing Sheets

ADDRESS TABLE 200

| MAC ADDR 202A | MLAG 204A | MLAG I/FS 206A |
|---|---|---|
| MAC ADDR 202B | MLAG 204B | MLAG I/FS 206B |
| MAC ADDR 202C | MLAG 204A | MLAG I/FS 206A |
| MAC ADDR 202D | MLAG 204A | MLAG I/FS 206A |
| MAC ADDR 202E | MLAG 204C | MLAG I/FS 206C |
| ... | ... | ... |
| MAC ADDR 202N | MLAG 204D | MLAG I/FS 206D |

FIGURE 2

UPDATING INTERFACE LIST OF MULTI-LINK GROUP

FIELD OF INVENTION

This invention relates generally to data networking and more particularly to performing a layer-2 next-hop group multi-link aggregation group failover.

BACKGROUND OF THE INVENTION

Multi-chassis link aggregation (MLAG) is the ability of two or more network elements to act like a single network element when forming link bundles. This allows a host to uplink to two network elements for physical diversity, while still having a single bundle interface to manage. In addition, two network elements can connect to two other network element using MLAG, with all links forwarding.

Since the network element treats each MLAG as a single bundle interface, the network element can associate this MLAG as a nexthop for an address, such as a Media Access Control (MAC) address. The network element uses an address table to store the association between a MAC address, the associated MLAG and the set of MLAG interfaces for this MLAG. Because the network element may know about lots of MAC addresses, this address table can store hundreds of thousands of MAC addresses or even over a million MAC addresses.

A problem can occur if a one or more of the links in the MLAG go down. If this situation occurs, the network element can use a backup set of links for this MLAG, such as the peer link between the other network element configured for this MLAG. In order to use the backup links, the network element needs to update the address table so as to have a current set of MLAG interfaces for the nexthop of the associated address. Because the network element does not a priori which address is associated to which MLAG, the network element needs to inspect and possibly update each and every entry in the address table. With the address table potentially having hundreds of thousands or even over a million entries, there is some time (e.g., several seconds or more) where the addresses are still associated with the downed link. During this updating time, there is the possibility that data destined for one of the addresses with the non-updated MLAG interface will be dropped.

SUMMARY OF THE DESCRIPTION

A method and apparatus of a network element that updates an interface list of a multi-link group of a network element is described. In an exemplary embodiment, a network element receives an indication that the interface list for the multi-link group on a network element is to change. In addition, the interface list includes a first set of interfaces. The network element further includes an address table having a plurality of address entries, where each of the plurality of address entries includes an address, a multi-link nexthop, and a tag group reference. The tag group reference references an entry in a tag group table, where a tag group entry includes a tag group identifier and a tag group set of interfaces. The network element further receives a second set of interfaces. The network element additionally updates the interface list for the tag group entry to include a second set of interfaces. Furthermore, the network element transmits data with the multi-link group using the second set of interfaces.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 2 is a block diagram of one embodiment of an address table, where each address table entry references a list of interfaces.

DETAILED DESCRIPTION

Figure 1A:
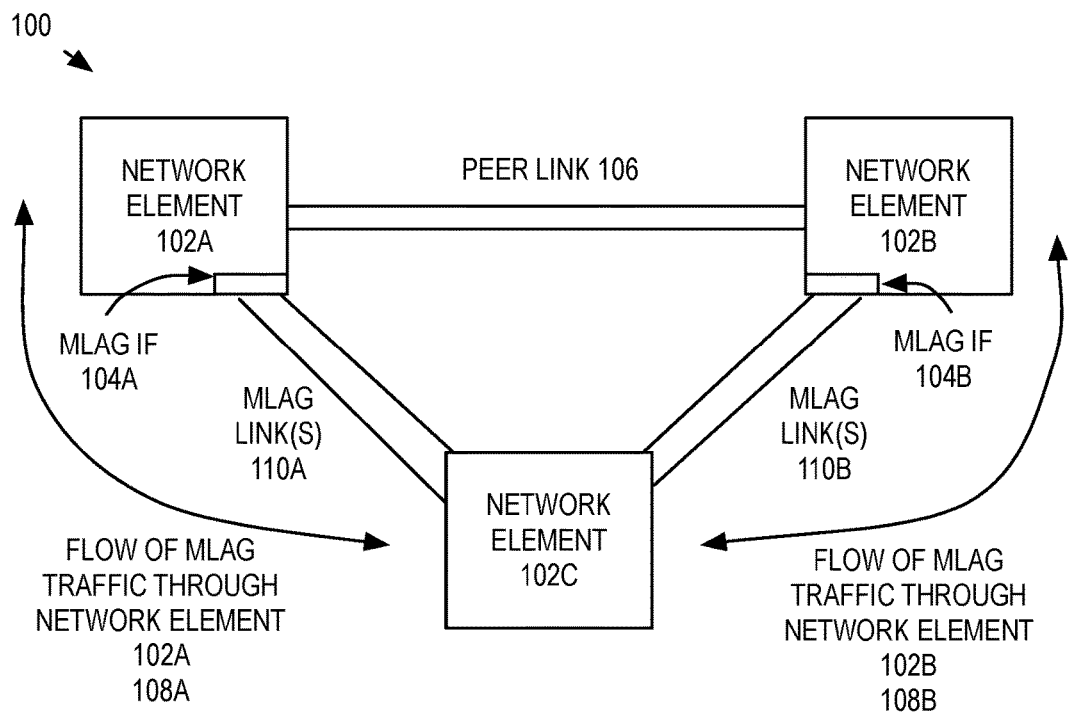
FIG. 1A is a block diagram of one embodiment of a system with an MLAG topology.

A method and apparatus of a network element that updates an interface list of a multi-link group of a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that updates an interface list of a multi-link group of a network element is described. In one embodiment, the network element participates in one or more MLAGs, where the network element includes a set of MLAG interfaces coupled to a set of MLAG links for each of the MLAGs. In addition, the network element includes an address table that stores an association between a known address (such as a Media Access Control (MAC) address) and a nexthop MLAG. Furthermore, the network element includes a tag group reference for each address and MLAG association, where the tag group references a set of MLAG interfaces. In one embodiment, the network element makes forwarding decisions for an address by looking up the address in the address table, determining the MLAG nexthop for the address and retrieving the MLAG set of interfaces for this MLAG using the tag group reference for the MLAG and address. The network element uses the retrieved set of MLAG interfaces to make a forwarding decision for the address.

In one embodiment, if the set of interfaces for an MLAG change (e.g., due to a failure of an MLAG link, a restoration of previous failed MLAG link, configuration by an administrator, and/or some other type of action), the network element will need to update the set of interfaces for this MLAG. In this embodiment, the network element updates the set of MLAG interfaces in the tag group table, where the network element needs to make the change once and not by inspecting each and every address in the address table. Because the change is made in the tag group table, the amount of time used to update an MLAG in the case of a failover is greatly diminished and the chance of a network service disruption due to dropped data.

FIG. 1A is a block diagram of one embodiment of a system 100 with a multi-chassis link aggregation group (MLAG) topology. In one embodiment, network elements 102A-B form an MLAG pair with network element 102C. In one embodiment, network elements 102A-B are coupled with each other over a peer link 108. The network elements 102A-C can each be a device that provides network access to a network (e.g., physical network, virtualized network, etc.). A network element can be a switch, router, hub, bridge, gateway, etc., or any type of device that can provide access to a network. In a further embodiment, the network element 102A-B and/or 104 can be a device that communicates with a network (e.g., server, personal computer, or another device that can communicate with a network). In one embodiment, one or more of the network elements 102A-C can be a physical or virtual device. In one embodiment, each of the network elements 102A-B can participate in more than one MLAG. In one embodiment, the MLAG illustrated in FIG. 1A is a multi-chassis link aggregation group.

In order to increase the bandwidth availability and redundancy for access to network(s) coupled to one of network elements 102A-C, network elements 102A-C can form a MLAG between them. In one embodiment, an MLAG is a way to inverse multiplex multiple links between network elements to increase bandwidth availability and redundancy. In addition, network elements participating in an MLAG will have two or more network elements configured to act like a single network element when forming the link aggregation groups. In this embodiment, this allows a device to uplink to the two network elements 102A-B. In one embodiment, the MLAG includes network elements 102A-B each having a separate set of links to the network element 102C (MLAG links 110A-B, respectively). Thus, in the MLAG, there are two sets of links 110A-B between the network elements 102A-B and 102C. In one embodiment, each of the MLAG links 110A-B can includes one or more links between the network elements 102A-C. For example and in one embodiment, MLAG link 110A includes two links coupling network element 102A and 102C via MLAG interface 104A on network element 102A. This results in the flow of data 108A between network element 102A and 102C. Similarly, MLAG link 110B includes two links coupling network element 102B and 102C via MLAG interface 104B on network element 102B. This results in the flow of data 108B between network element 102A and 102C. Thus, an MLAG is a type of a multi-link group.

Figure 1B:
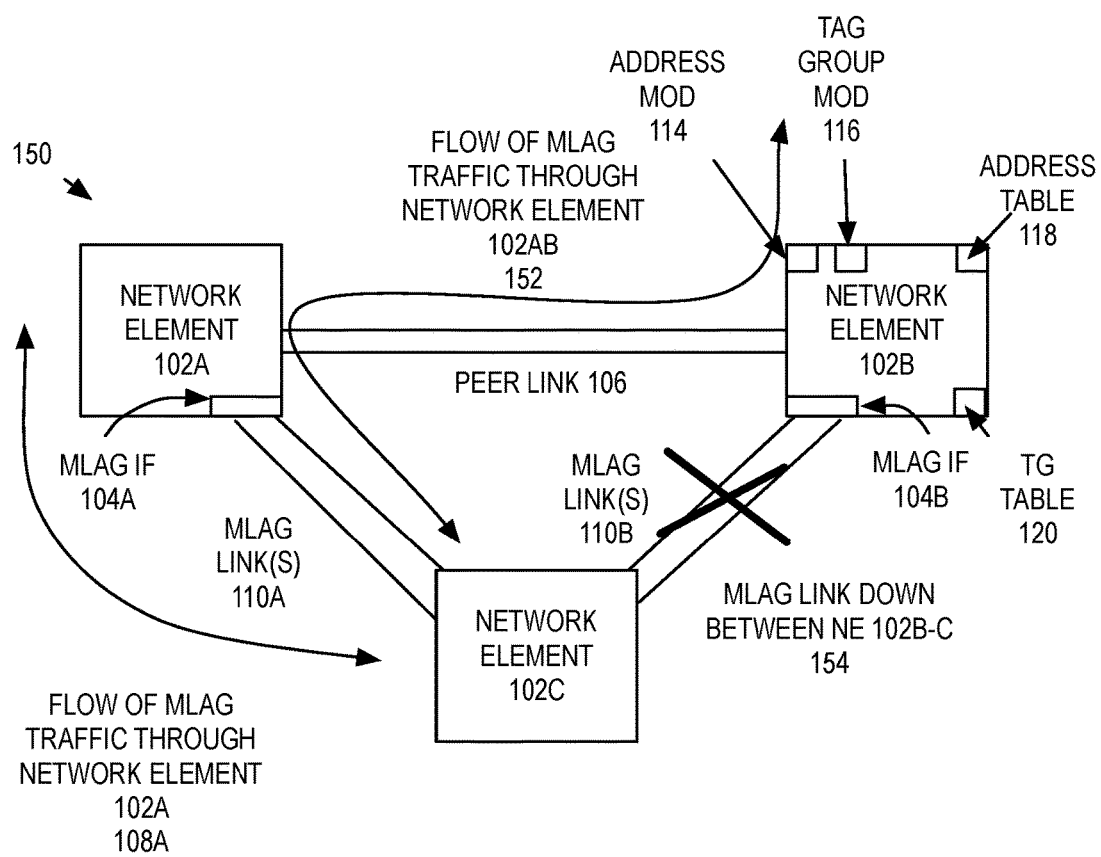
FIG. 1B is a block diagram of one embodiment of a system with an MLAG topology, where an MLAG failover has occurred.

In one embodiment, if one of the MLAG links 110A-B fails, the peer link 106 can be used to forward the traffic to network element 102C through the other network element. FIG. 1B is a block diagram of one embodiment of a system 150 with an MLAG topology, where an MLAG failover has occurred. Similar to FIG. 1A, system 150 includes the network elements 102A-B coupled to network element via MLAG links 110A-B and network elements 102A-B are coupled together via the peer link 106. In one embodiment, however, the MLAG link 110B has failed. In this embodiment, network element 102B uses the peer link 106 to forward data to the network element 102C. In order to achieve the failover, the network element 102B can update one type of address table 118 that associates a set of known addresses with the next hop for those addresses. In one embodiment, the address tables 118 stores entries for each known Media Access Control (MAC) addresses that associates this MAC to a MLAG link and the associated set of interfaces for that MLAG. Thus, in this embodiment, the address table 118 stores the information used to make forwarding decision for an address. In this embodiment, when an MLAG link is failed over from one set of links to another, the network element inspects each entry in the address table and updates the set of interfaces form the old set that represents the failed set of links to the new set of interfaces. For example and in one embodiment, if the MLAG link 110B failed, the network element 102B would use the peer link 106 as the backup link to forward data to network element 102C. In this example, the network element 102B would update the address table such that addresses that have the MLAG link 110B as the nexthop would use the MLAG interface 104C instead of the MLAG interface 104B. In one embodiment, the MLAG illustrated in FIG. 1B is a multi-chassis link aggregation group.

In this embodiment, a problem can occur because the number of addresses in the address table can be very large. For example and in one embodiment, the address table can have hundreds of thousands or even over a million addresses. This updating process of MLAG interfaces for each and every address in the address table can take time (e.g., up to several seconds, which depends on the size of the address table 118), in which data for address that have not been updated will be forwarded using the downed link. In this example, if an address is associated with the downed link, data being forwarded to that address will be dropped.

Because the network element does not know a priori which of the addresses use which of the MLAG links, the network element inspects each and every address in the address table to determine if this address needs to be updated. Thus, there can be a disruption of service for addresses that are still associated with the downed MLAG link. For example and in one embodiment, for a large table of hundreds of thousands of addresses, the updating of the address table can take upwards of several seconds, which can lead to a disruption of network services for these addresses until the addresses MLAG information can be updated during this time.

FIG. 2 is a block diagram of one embodiment of an address table 200, where each address table entry references a list of interfaces. In FIG. 2, address table 200 includes entries for MAC addresses 202A-N, where each of these MAC addresses 202A-N are associated with a nexthop MLAG 204A-D, and each of the MLAGs 204A-D has an associated set of interfaces 206A-D. For example and in one embodiment, MAC addresses 202A, 202C, and 202D have the MLAG 204A as the nexthop, MAC address 202B has the MLAG 204B as the nexthop, MAC address 202E has the MLAG 204C as the nexthop, and MAC address 202N has the MLAG 204D as the nexthop. In addition, each of the MLAGs 204A-D has a set of interfaces 206A-D, respectively. In one embodiment, because the MLAG interface 206A-D values are replicated in the table, a network element would need to inspect each and every MAC entry to update an MLAG interface if the MLAG interface needs to change because of a MLAG failover or restoration.

Returning to FIG. 1B, in order to reduce the potential of the network service disruption, in one embodiment, the network element 102B includes a different type of address table 118, tag group table 120, address module 114, and tag group module 116. As will be described below, entries in the address table 118 each reference an entry in the tag group table 120, where the tag group table 120 includes a set of MLAG interfaces for that MLAG. In one embodiment, the address module 114 adds an address to the address table 118 and is further described in FIG. 5 below. In one embodiment, the tag group module 116 updates an interface list for a tag group and is further described in FIG. 6 below.

Figure 3:
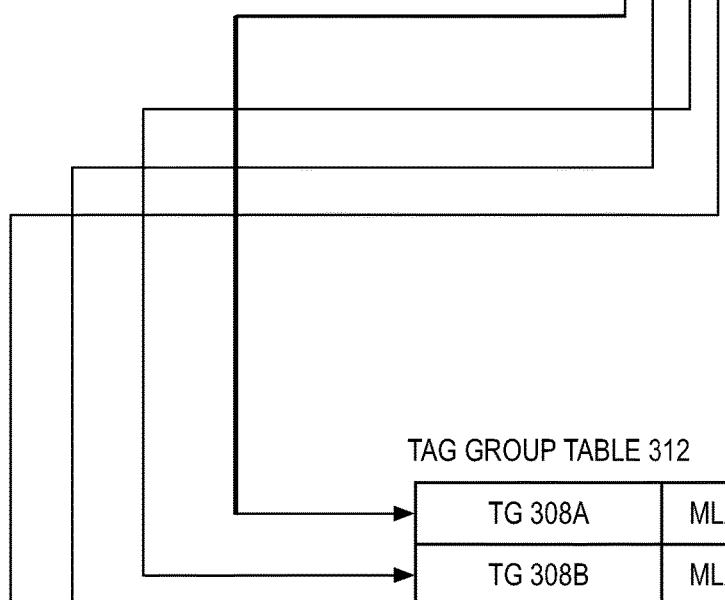
FIG. 3 is a block diagram of one embodiment of an address table, where each address table entry references a tag group.

In one embodiment, instead of replicating this MLAG interface information for each and every address in an address table, the network element 102B can use indirection and store a reference for a tag group for an MLAG. In this embodiment, the tag group references a tag group in a tag group table, which stores the MLAG interface information for each MLAG. FIG. 3 is a block diagram of one embodiment of an address table 300, where each address table entry references a tag group. In one embodiment, the address table 300 is the address 118 as illustrated in the FIG. 1B. In FIG. 3, the address table 300 includes entries for MAC addresses 302A-N, where each of these MAC addresses 302A-N are associated with a nexthop MLAG 304A-D. Instead of storing the MLAG interfaces for each address as in address table 200, the address table 300 stores a tag group reference 306A-D for each of the addresses 300A-N. For example and in one embodiment, MAC addresses 302A, 302C, and 302D have the MLAG 304A as the nexthop, MAC address 302B has the MLAG 304B as the nexthop, MAC address 302E has the MLAG 304C as the nexthop, and MAC address 302N has the MLAG 304D as the nexthop. In addition, each of the MLAGs 204A-D references a tag group 306A-D, respectively. In this example, a tag group is a set of interfaces that are logically associated with the MLAG. For example and in one embodiment, MLAG 304A is associated with tag group reference 306A, which references the tag group 308A in the tag group table 312. MLAG 304B is associated with tag group reference 306B, which references the tag group 308B in the tag group table 312. MLAG 304C is associated with tag group reference 306C, which references the tag group 308C in the tag group table 312. MLAG 304D is associated with tag group reference 306D, which references the tag group 308D in the tag group table 312.

In one embodiment, the tag group table 312 stores the tag groups 308A-D, which are the collection of interface sets for each MLAG. For example and in one embodiment, tag groups 308A-D include MLAG interfaces 310A-D.

Figure 4:
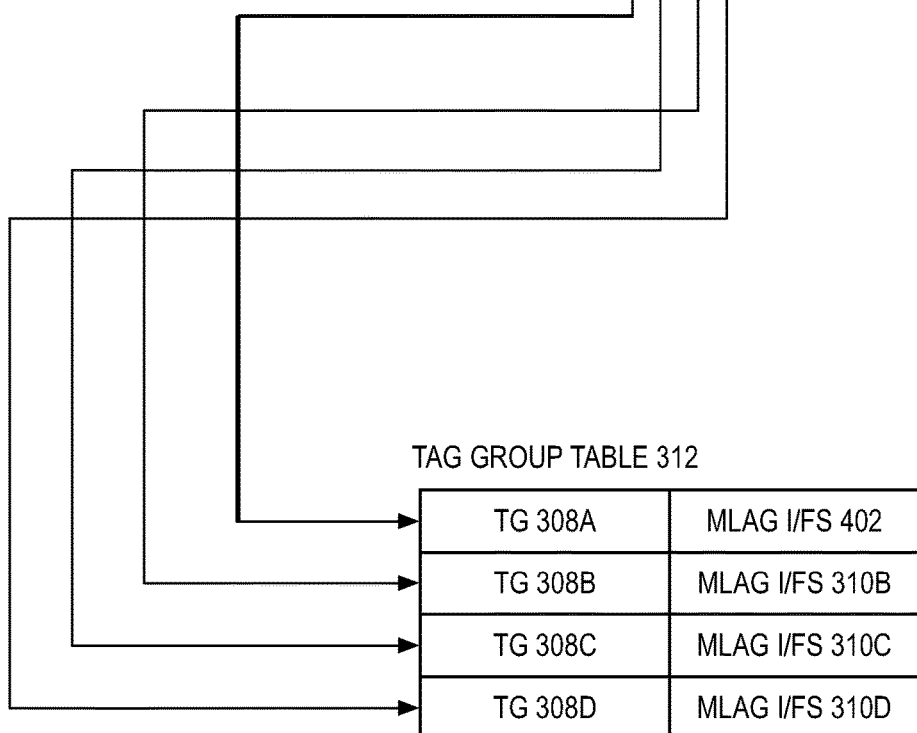
FIG. 4 is a block diagram of one embodiment of an address table, where each address table entry references a tag group after an update to the tag group interface list.

In one embodiment, by storing the MLAG interfaces 310A-D in the tag group table 312, the maintaining of the MLAG interfaces 310A-D is greatly simplified. Instead of the network element inspecting each and every entry in the address table 300 to update a set of MLAG interfaces, the network element just needs to update one entry in the tag group table 312. FIG. 4 is a block diagram of one embodiment of an address table 400, where each address table entry references a tag group after an update to the tag group interface list. In FIG. 4, address table 300 is as described in FIG. 3, where each of the address entries for a MAC address 302A-N references one of the tag group references 306A-D. In addition, the tag group table 312 includes tag groups 308A-D, where tag group 308A includes a set of MLAG interfaces 402 that have change to a new set. Thus, in this embodiment, the MLAG interface information is updated in the tag group table 312 and each MAC address 302A that is associated with the tag group is now associated with the updated set of MLAG interfaces 402 without the network element having to inspect and possibly update each and every MAC address entry. With the tag group table, the network element the network element makes forwarding decisions for an address by looking up the address in the address table, determining the MLAG nexthop for the address and retrieving the MLAG set of interfaces for this MLAG using the tag group reference for the MLAG and address. The network element uses the retrieved set of MLAG interfaces to make a forwarding decision for the address by selecting one of the MLAG interfaces to transmit the data.

Figure 5:
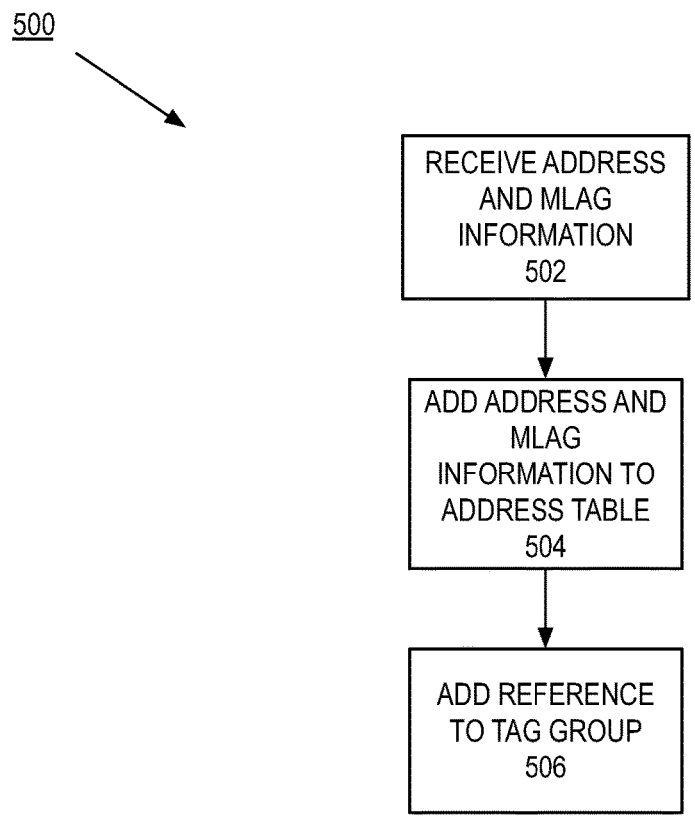
FIG. 5 is a flow diagram of one embodiment of a process to add an address to an address table that uses a tag group.

FIG. 5 is a flow diagram of one embodiment of a process 500 to add an address to an address table that uses a tag group. In one embodiment, process 500 is performed by an address module that adds an address to an address table, such as the address module 114 as described in FIG. 1B. In FIG. 5, process 500 begins by receiving an address and the associated MLAG information at block 502. In one embodiment, process 500 receives the address and MLAG information from an address announcement (e.g., using an address resolution protocol such Address Resolution Protocol ARP), receiving a packet on MLAG interface, configuration information, the MLAG peer to sync the locally learnt MAC addresses on MLAG interfaces and/or other ways to receive this information. At block 504, process 500 adds the address and MLAG information to the table. In one embodiment, process 500 does an address lookup to determine if the address exists in the address table. If the address does exist, process 500 updates (if needed) the MLAG information for the existing address. If the address does not exist, process 500 adds the address (e.g., MAC address) and the MLAG information to the address table. Process 500 adds the reference to the corresponding tag group at block 506. In one embodiment, process 500 does a lookup in the tag group table for the reference to a tag group corresponding to the MLAG for this address. In another embodiment, the MLAG identifier is an index to the tag group table and the MLAG identifier would be the tag group reference. With the tag group reference, process 500 adds the tag group reference to the address table entry for the address.

Figure 6:
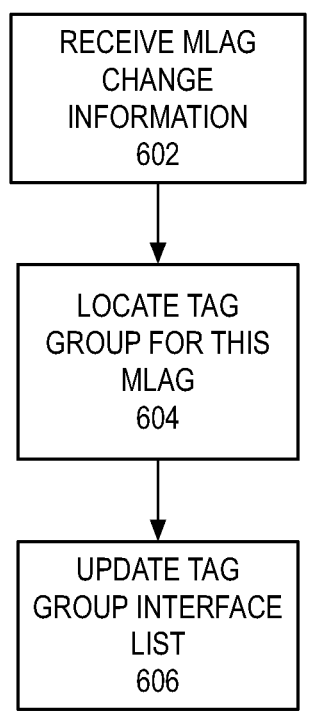
FIG. 6 is a flow diagram of one embodiment of a process to update a tag group interface list.

FIG. 6 is a flow diagram of one embodiment of a process 600 to update a tag group interface list. In one embodiment, process 600 is performed by a tag group module 116 that updates the tag group interface list, such as the tag group module 116 as described in FIG. 1B. In FIG. 6, process 600 begins by receiving the MLAG change information. In one embodiment, the MLAG change information is the MLAG identifier and the new set of interfaces for this MLAG at block 602. In this embodiment, the new set of interfaces for this MLAG can be a backup set of interfaces, a restored set of interfaces, or another set of interfaces. At block 604, process 600 locates the tag group for this MLAG. In one embodiment, process 600 does a lookup in the tag group table for the reference to a tag group corresponding to the MLAG. In another embodiment, the MLAG identifier is an index to the tag group table and the MLAG identifier would be the tag group reference. With the tag group reference, process 600 updates the set of interfaces for this MLAG in the tag group table.

Figure 7:
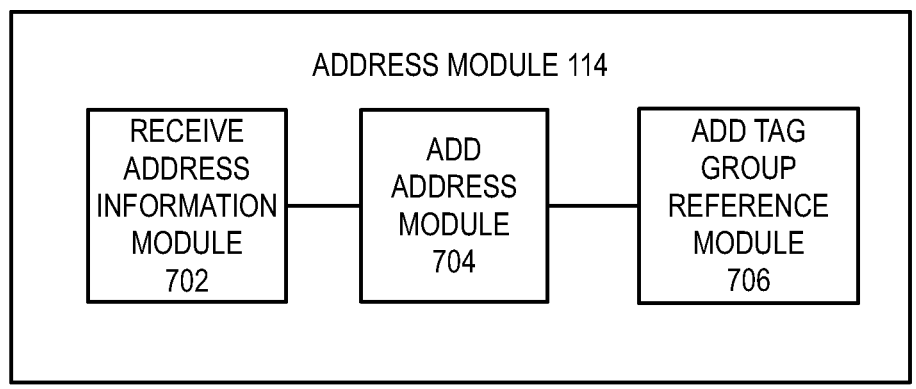
FIG. 7 is a block diagram of an address module that adds an address to an address table that uses a tag group.

FIG. 7 is a block diagram of an address module 114 that adds an address to an address table that uses a tag group. In one embodiment, the address module 114 includes a receive address information module 702, add address module 704, and add tag group reference module 706. In one embodiment, the receive address information module 702 receives the address and MLAG information as described in FIG. 5, block 502 above. The add address module 704 adds the address and MLAG information to the address table as described in FIG. 5, block 504 above. The add tag group reference module 706 adds the reference to the tag group as described in FIG. 5, block 506 above.

Figure 8:
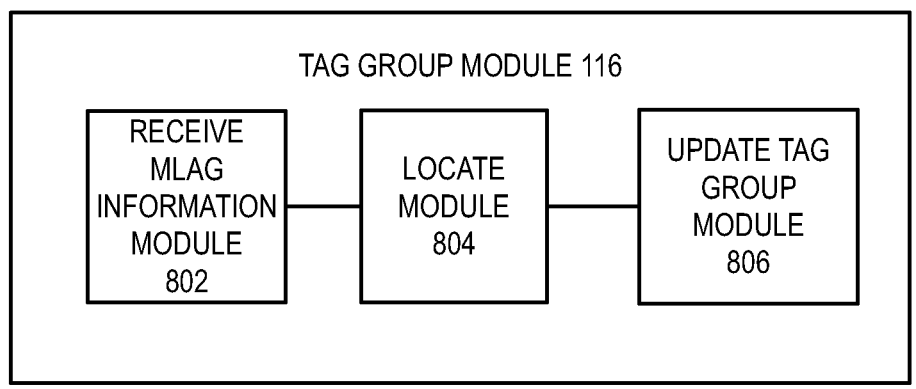
FIG. 8 is a block diagram of a tag group module that updates a tag group interface list.

FIG. 8 is a block diagram of a tag group module 116 that updates a tag group interface list. In one embodiment, the tag group module 116 includes a receive MLAG information module 802, locate module 804, and update tag group module 806. In one embodiment, the receive MLAG information module 802 receives the MLAG change information as described in FIG. 6, block 602 above. The locate module 804 locates the tag group for this MLAG as described in FIG. 6, block 604 above. The update tag group module 806 updates the tag group interface list as described in FIG. 6, block 606 above.

While in one embodiment, the tag group table is used in conjunction with a MLAG configuration, in alternate embodiments, the tag group table can be used with single member or multi member link aggregation groups or other types of aggregation groups).

Figure 9:
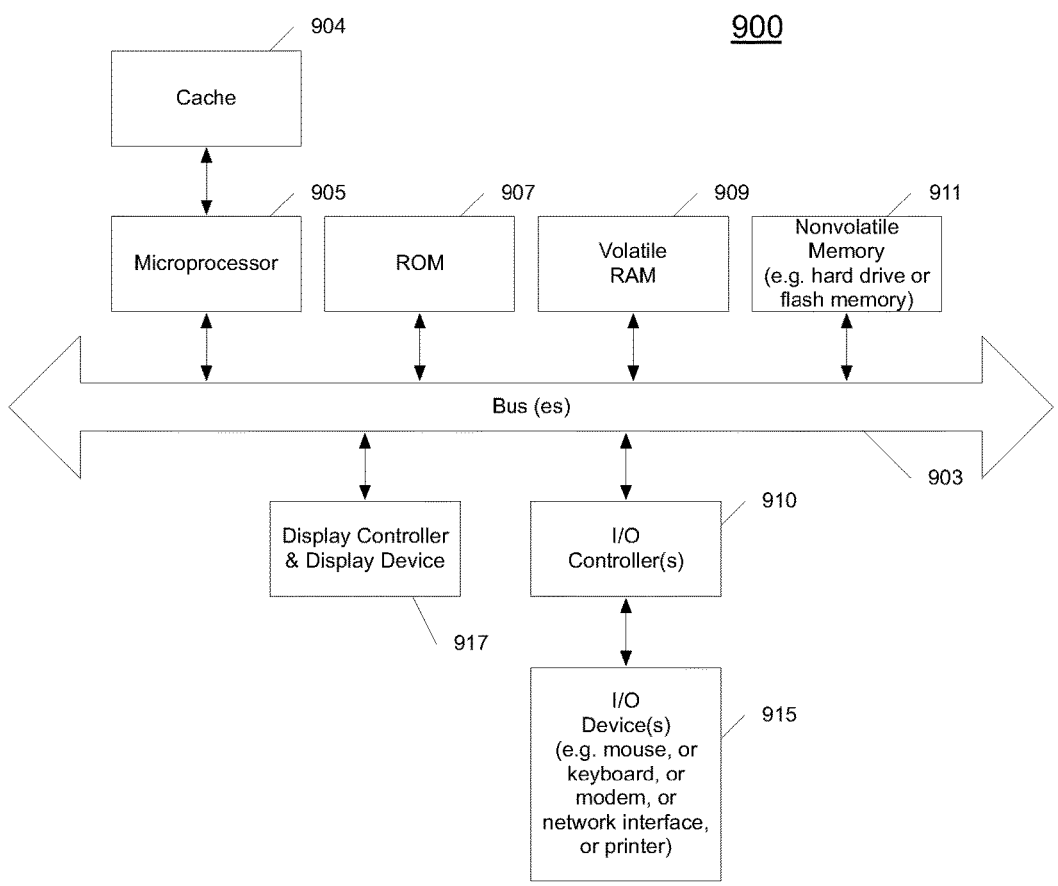
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including network elements 102A-B as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 915 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network date received on one interface out another interface.

Typically, the input/output devices 915 are coupled to the system through input/output controllers 917. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
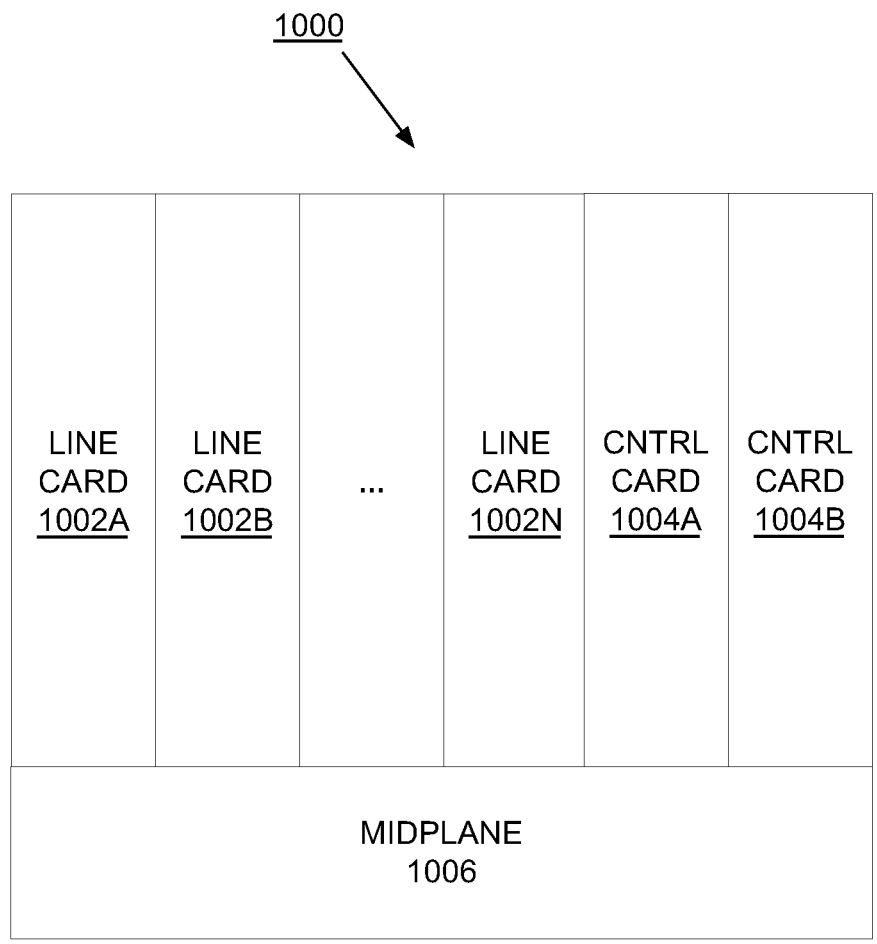
FIG. 10 is a block diagram of one embodiment of an exemplary network element that updates a tag group interface list.

FIG. 10 is a block diagram of one embodiment of an exemplary network element 1000 that updates a tag group interface list. In FIG. 10, the midplane 1006 couples to the line cards 1002A-N and controller cards 1004A-B. In one embodiment, the network element 1000 can be a fixed-configuration system or a modular system with one or more line cards. While in one embodiment, the controller cards 1004A-B control the processing of the traffic by the line cards 1002A-N, in alternate embodiments, the controller cards 1004A-B, perform the same and/or different functions (e.g., updating a tag group interface list, etc.). In one embodiment, the line cards 1002A-N process and forward traffic according to the network policies received from controller cards the 1004A-B. In one embodiment, the controller cards 1004A-B update a tag group interface list for one of the line cards 1002A-N as described in FIG. 6. In this embodiment, one or both of the controller cards includes the tag group module to updates a tag group interface list, such as the tag group module 116 as described in FIG. 1 above. In another embodiment, the line cards 1002A-N update a tag group interface list on one or more of the ports of the respective line card 1002A-N as described in FIG. 6. It should be understood that the architecture of the network element 1000 illustrated in FIG. 10 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "receiving," "updating," "retrieving," "transmitting," "forwarding," "storing," "adding," "returning," "communicating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units perform a method to update an interface list of a multi-link group of a network element, the method comprising:
   receiving an indication that the interface list for the multi-link group on a network element is to change, wherein:
   the interface list includes a first set of interfaces;
   the network element includes an address table having a plurality of address entries;
   each of the plurality of address entries includes an address, a multi-link nexthop, and a tag group reference;
   the tag group reference indicates a tag group entry in a tag group table; and
   the tag group entry includes a tag group identifier and a tag group set of interfaces;
   receiving a second set of interfaces;
   updating the interface list for the tag group entry to include the second set of interfaces; and
   transmitting data with the multi-link group using the second set of interfaces.

2. The machine-readable medium of claim 1, wherein the multi-link group is a Multi-Link Aggregation Group.

3. The machine-readable medium of claim 1, wherein each of address entries stores a Media Access Control (MAC) address.

4. The machine-readable medium of claim 1, wherein the first set of interfaces includes a first plurality of interfaces.

5. The machine-readable medium of claim 1, wherein the second set of interfaces includes a second plurality of interfaces.

6. The machine-readable medium of claim 1, wherein the second set of interfaces is a backup set of interfaces.

7. The machine-readable medium of claim 1, wherein the second set of interfaces is a peer link between the network element and another network element that participates in the multi-link group.

8. The machine-readable medium of claim 1, further comprising:
receiving an address for a packet;
performing a lookup of the address in the address table;
retrieving a tag group reference for the address from the address table; and
retrieving the second set of interfaces using the tag group reference from the tag group table;
transmitting the packet using one of the second set of interfaces.

9. A method to update an interface list of a multi-link group of a network element, the method comprising:
receiving an indication that the interface list for the multi-link group on a network element is to change, wherein:
the interface list includes a first set of interfaces;
the network element includes an address table having a plurality of address entries;
each of the plurality of address entries includes an address, a multi-link nexthop, and a tag group reference;
the tag group reference indicates a tag group entry in a tag group table; and
the tag group entry includes a tag group identifier and a tag group set of interfaces;
receiving a second set of interfaces;
updating the interface list for the tag group entry to include the second set of interfaces; and
transmitting data with the multi-link group using the second set of interfaces.

10. The method of claim 9, wherein the multi-link group is a Multi-Link Aggregation Group.

11. The method of claim 9, wherein each of address entries stores a Media Access Control (MAC) address.

12. The method of claim 9, wherein the first set of interfaces includes a first plurality of interfaces.

13. The method of claim 9, wherein the second set of interfaces includes a second plurality of interfaces.

14. The method of claim 9, wherein the second set of interfaces is a backup set of interfaces.

15. The method of claim 9, wherein the second set of interfaces is a peer link between the network element and another network element that participates in the multi-link group.

16. The method of claim 9, further comprising:
receiving an address for a packet;
performing a lookup of the address in the address table;
retrieving a tag group reference for the address from the address table; and
retrieving the second set of interfaces using the tag group reference from the tag group table;
transmitting the packet using one of the second set of interfaces.

17. A network element that updates an interface list of a multi-link group of a network element, the network element comprising:
a processor;
a memory coupled to the processor through a bus; and
a process executed from the memory by the processor that causes the processor to receive an indication that the interface list for the multi-link group on a network element is to change, receive a second set of interfaces, update the interface list for the tag group entry to include the second set of interfaces, and transmit data with the multi-link group using the second set of interfaces, wherein:
the interface list includes a first set of interfaces;
the network element includes an address table having a plurality of address entries;
each of the plurality of address entries includes an address, a multi-link nexthop, and a tag group reference;
the tag group reference indicates a tag group entry in a tag group table; and
the tag group entry includes a tag group identifier and a tag group set of interfaces.

18. The network element of claim 17, wherein the multi-link group is a Multi-Link Aggregation Group.

19. The network element of claim 17, wherein each of address entries stores a Media Access Control (MAC) address.

20. The network element of claim 17, wherein the first set of interfaces includes a first plurality of interfaces.

* * * * *